United States Patent [19]

Macevicz et al.

[11] 3,940,336

[45] Feb. 24, 1976

[54] METHOD FOR CLEANING SEMIPERMEABLE MEMBRANES

[75] Inventors: Clement C. Macevicz; Charles W. Million, both of San Diego, Calif.

[73] Assignee: Desalination Systems, Inc., Escondido, Calif.

[22] Filed: June 21, 1974

[21] Appl. No.: 481,522

[52] U.S. Cl.................. 210/81; 210/433 M; 134/34
[51] Int. Cl.²... B01D 23/24; B03B 3/00; B08B 3/00
[58] Field of Search ................ 210/81, 433; 134/34; 423/580

[56] References Cited
UNITED STATES PATENTS
3,654,148   4/1972   Bradley.............................. 210/433

OTHER PUBLICATIONS

Reverse Osmosis Applications, B. Leightell, Chemical & Process Engineering, June, 1971, pp. 79–80.

Primary Examiner—Frank A. Spear, Jr.
Assistant Examiner—Ferris H. Lander
Attorney, Agent, or Firm—Clement H. Allen

[57] ABSTRACT

Mud, slime, precipitated particles and other foreign matter are removed from the surface of a semipermeable membrane used in a membrane process system by flushing, preferably with the membrane in place in its cartridge or container, with water of purity greater than 1 megohm resistivity.

7 Claims, No Drawings

METHOD FOR CLEANING SEMIPERMEABLE MEMBRANES

THE BACKGROUND OF THE INVENTION

1. The Field of the Invention

This invention relates to cleaning a semipermeable membrane used in a reverse osmosis or ultrafiltration system.

2. The Prior Art

A layer of slime, mud, salts, rust, insoluble particles or precipitates, or other foreign material often tends to deposit, after a period of use, on the surface of semipermeable membranes employed in membrane separation process systems such as reverse osmosis and ultrafiltration. Such deposits seriously reduce membrane efficiency; they block or blind the membrane surface, and reduce flux and often the salt rejection. If the membrane surfaces can not be cleaned at intervals, premature membrane replacement may be required to maintain plant output and product quality.

Many methods have been suggested or used for cleaning semipermeable membranes used in membrane process systems. These methods have included washing or flushing the membrane surfaces with a variety of solvents or solutions, often detergent solutions. Water sprays or pressurized water have been proposed to hydraulically loosen foreign material. Scrubbing as by use of sponges, soft plastic balls or other semi-rigid bodies has been suggested, often in conjunction with water or solution application.

A problem with such methods is that detergent and solvent solutions must be mild in order not to damage by chemical attack the membrane itself or the glue used in cartridge assemblies. Many detergent solutions are alkaline, which promotes hydrolysis of membrane materials such as cellulose acetate, with resulting early failure. Hydraulic or mechanical action must be carefully employed since the membrane is structurally relatively weak, and the active surface layer is characteristically extremely thin. On the other hand, many slime and mud formations may be considered to be refractory. They are often bound tightly into adhesive films, which are difficult to remove employing relatively mild solutions or dislodging methods which could otherwise be employed. Another disadvantage of the use of solvents or detergent solutions is that these may have to be carefully removed from the membrane surface by rinsing after use, to avoid possible contamination of product water, or the concentrate, which might be the wanted product as in an ultrafiltration process.

This invention employs a pure liquid for membrane cleaning, which contains no detergents or alkalis, which does not promote hydrolysis of membrane materials, which very effectively cleans mud, slime and other foreign materials from the surface of a semipermeable membrane, and which requires no rinsing after use and before restarting operation of the system.

BRIEF SUMMARY OF THE INVENTION

Summarized briefly, this invention comprises a method for cleaning a semipermeable membrane in a membrane process solution treatment system, in which a surface of such a membrane is cleaned by flushing with ultrapure water, that is water of purity greater than one megohm resistivity, and preferably between about one megohm and about 18 megohms resistivity. Preferably, the surface of a semipermeable membrane is flushed with water of purity greater than one megohm resistivity at a rate between about one-tenth gallon and about ten gallons per hour of water per square foot of membrane area; and the flushing time should extend over a period of between about one and about fifteen hours. And, preferably also, the membrane is maintained in place in its working assembly, for example a cartridge or module, during cleaning.

The water of purity greater than one megohm resistivity is conveniently produced by deionization of water containing a substantial content of total dissolved solids; deionization is a well known process and apparatus using ion exchange resin beds or mixed resin beds is commercially available. Water containing more than 200 parts per million total dissolved solids may be first treated by a semipermeable membrane process, as reverse osmosis, to reduce its solids content below about 200 parts per million, and this can then be treated by deionization as by contact with ion exchange resins, to produce water of purity greater than one megohm resistivity.

DESCRIPTION OF PREFERRED EMBODIMENTS

The purity of water, in the range of relatively high purity, is defined by its content of total dissolved solids in terms of parts per million. Thus, municipal supply water is often in the range of 1000 to 500 ppm (parts per million), or below, of total dissolved solids. Purified municipal water for drinking and cooking of so-called bottled water grade, may contain 200 to 50 ppm total dissolved solids, more or less. Such purities may readily be obtained by membrane processes such as reverse osmosis; however, the limit of purity with such treatment is in the low ppm range. Water of purity greater than this must ordinarily be produced by deionization, using ion exchange resins. Such purification can produce water purity which can not be readily determined by methods used for the parts per million range. The purity in this ultrapure range is determined by electrical resistivity in megohms, the methods for making such determination being well known and the required apparatus being commercially available. The crossover between ppm and megohms in the overall scale is at about one megohm resistivity, at which purity level commercial units indicating parts per million of dissolved salts have reached the low end (highest purity) of their useful range. Highest purity water may be obtained by treatment with mixed beds of ion exchange resins.

The process of this invention comprises cleaning a surface of a semipermeable membrane by flushing with ultrapure water, that is water of purity greater than one megohm resistivity, and preferably between about one megohm and about 18 megohms resistivity. Water less pure than this and whose purity will ordinarily be defined in terms of parts per million of total dissolved solids, does not possess the required solvent action. The upper limit of purity, namely about 18 megohms resistivity, is of purity such that essentially all the conductivity results from $H^+ + OH^-$ equilibrium reaction, and essentially no dissolved ionized salts remain.

The surface of the semipermeable membrane should be flushed with water of purity greater than about one megohm resistivity, preferably at a rate between about one-tenth gallon and about ten gallons per hour of such water per square foot of membrane area. While this does not provide very precise control of the volume of ultrapure water passed over the membrane surface, it does provide a general rule for use of the process of this invention, particularly when flushing with ultrapure water is accomplished with the membrane to be cleaned maintained in place in its working assembly, which may be cartridge, pack, or module unit, together with spacers, flow control materials, and other elements. There should be an appreciable flushing action or flow rate over the membrane surface to remove foreign material as it is loosened, and to thus continually expose a fresh surface for action by the ultrapure water. Less than about one-tenth gallon per hour per square foot of membrane area may at times be insufficient to ensure that this is accomplished, while more than about 10 gallons per hour per square foot of membrane area will generally be more than required, will be wasteful of the ultrapure water, and result in unnecessary cost increase for the cleaning process.

Using the flushing rates described above, a time of treatment of from about one to about fifteen hours will remove ordinarily encountered membrane surface deposits. The minimum time of about one hour will loosen and remove easily separated foreign materials, while a time in the upper portion of the range may be found advantageous for removing deposits or accumulations of a more refractory nature. The minimum time of flushing will be found to be advantageous to obtain a clean efficient membrane surface even with little deposit to be removed. More than about fifteen hours treatment will generally not produce any additional benefit, may be wasteful of the ultrapure water and can cause an unduly long shut-down period for membrane cleaning.

An advantageous method for determining the amount of flushing water or time of treatment required is to test the ultrapure flush water after treatment of the membrane surface. At the beginning of cleaning treatment, the flush water, which will be an effluent from a cartridge or module if cleaning is accomplished with the membrane in place, will show the presence of dissolved salts and possibly suspended solids caused by dissolution and removal of material deposited on the membrane surface. Periodic testing of the effluent flush water should be continued until this shows a purity approaching that of the original ultrapure flush water, or has approached a steady state purity in the megohm range. This will indicate that dissolution of dissolved material has substantially ceased, cleaning has been accomplished and flushing may be terminated. Obviously, the purity of the effluent flush water will never, as a practical matter, equal the purity of the original flush water, but reaching an almost steady purity in the megohm range will indicate a satisfactory end of the cleaning process.

The method of this invention is preferably employed to clean a surface of a semipermeable membrane in place in its working assembly, which may be a cartridge or module often used in reverse osmosis and ultrafiltration systems. A common type of such a working assembly is the so-called spiral wound cartridge, which comprises a semipermeable membrane interleaved with product water transfer material and brine-side spacer mesh wound into a compact assembly around a central tube to form a cartridge. This cartridge is enclosed in a pressure resistant container to form a module, of which a sufficient number are employed to produce desired capacity in a complete system.

The following examples illustrate operation of the method of this invention:

EXAMPLE 1

A small module of a commercially available type containing a semipermeable membrane cartridge of the so-called spiral wound design in which the semipermeable membrane area was about 5 square feet had been in household service purifying Colorado River water from a municipal supply at a pressure of about 100 psi for a period of twelve months. The purified product water produced initially contained 35 ppm total dissolved solids and was produced by the 5 square foot cartridge at a rate of 1 gallon per square foot of membrane area per day. After the 12 months period of use, the purity of the purified product water was 70 ppm total dissolved solids, and the flux rate had dropped to 0.6 gallon per square foot of membrane area per day. The membrane surface over which the feed water flowed had accumulated a layer of slime, sludge, or foreign material which was seriously reducing its osmotic efficiency.

The membrane surface in this condition, and in place without dismantling the module, was flushed by passing water of purity about 18 megohms resistivity through the module and over the semipermeable membrane active surface at a rate of 1 gallon per hour for a period of about 10 hours. This amounted to one-fifth gallon per hour per square foot of membrane surface area. The cleaned module was then replaced in service without further treatment, purifying water from the same source and at the same pressure as before, and produced purified product water of about 40 ppm total dissolved solids at a flux rate of 0.9 gallon per square foot of membrane area per day, or almost the same as when initially placed in service. This indicated that the semipermeable membrane surface had been effectively cleaned by flushing with ultrapure water.

EXAMPLE 2

A spiral wound cartridge of larger size containing about 40 square feet of semipermeable membrane surface area was installed in a module in a commercial reverse osmosis system purifying municipal water at pressure of 450 psi. After a number of months, the membrane active surface became coated and fouled with sludge or slime indicated by a drop in its output per square foot of membrane area and the purity of its purified product water.

The cartridge was cleaned by flushing with ultrapure water of about 18 megohms resistivity, this water being passed through the module containing the cartridge for about 3 hours at a rate of 200 gallons per hour corresponding to 5 gallons per square foot of membrane area per hour. After this time, the flushing water effluent, or water after passing through the module, was found to have reached a steady state purity approaching the 18 megohm purity water introduced into the module.

After cleaning, the membrane cartridge was completely disassembled and carefully inspected. The membrane surface exposed to incoming feed liquid, as well as other parts of the cartridge assembly were absolutely clean with no sign of sludge, slime or foreign material, and appeared as new. The membrane itself appeared to have suffered no damage, and the glue line where the membrane edge was glued to the water transfer sheet was absolutely tight and in perfect condition. The ultrapure water had not attacked either the membrane or the glue.

After inspection, the cartridge was re-rolled back into spiral form and tested using as a feed Colorado River municipal water of 750 ppm total dissolved solids content at 100 psi, and at 400 psi feed water pressure. At 100 psi operating pressure, the flux and product purity were up slightly over that to be expected from a new similar cartridge. At 400 psi, operating pressure, the flux and product water purity approached original output.

Ultrapure water of purity greater than one megohm resistivity may conveniently be prepared by treating water having a substantial total dissolved solids content by a commercially well known and commonly used deionization processes often using ion exchange resin beds. Water of municipal purity containing a substantial content of total dissolved solids, as for example, over two hundred to about one thousand ppm total dissolved solids may be so treated to produce required ultrapure water. A somewhat more efficient and believed lower cost process, comprises first treating the original municipal supply water containing a substantial content and over 200 ppm of total dissolved solids by reverse osmosis to reduce its total dissolved solids content to below about 200 ppm. This less than about 200 ppm water will form a feed of advantageously low dissolved salt or solids content feed for treatment by deionization using ion exchange resin beds to produce ultrapure water of greater than one megohm resistivity for use in the membrane cleaning method of this invention.

The reason for the surprisingly efficient cleaning action of the ultrapure water employed in the practice of this invention is not fully understood. It is postulated that the almost complete absence of any dissolved salts in water of purity in the megohm range causes a very strong tendency to dissolve any soluble materials with which it may be in contact. Thus any, even slightly soluble materials which bind the slime or sludge together to form an adhesive film, are dissolved, and disintegration of the film and flushing away of the foreign matter results.

Aside from requirements for an appreciable flushing action, that is a flow of ultrapure water over the semipermeable membrane surface, consideration of other conditions, such as the pressure at which the flushing water is contacted with the membrane surface, is not critical. As described, the cleaning process involves a surface flush or wash, and the ultrapure water is clearly not intended to penetrate or permeate through the membrane. Therefore, only incidental pressure which might be required to circulate the ultrapure water over the active membrane surface would be required, and this would be at most only slightly above atmospheric. The actual pressure would, of course, be such as to accomplish the flushing process, that is within the operable range for practice of the invention; this pressure would be substantially atmospheric as will be evident to those skilled in the art.

I have found that sludge, adhering slime, and films containing normally very difficult to remove substances such as calcium sulphate, magnesium sulphate, calcium carbonate and ferric hydroxide may be readily cleaned from the surface of a membrane on the method of this invention. Such substances can precipitate from water when their concentration is increased during a reverse osmosis or ultrafiltration process, and the precipitated solids often form an adherent tough and almost scale-like deposit.

It is exceptionally advantageous that such an effect can be obtained using an ultrapure water instead of detergent solutions and scrubbing methods previously proposed. The ultrapure water has no deterious effect on the semipermeable membrane so that it may be used with reasonable frequency to maintain membrane surface cleanliness. Since it does not contain detergents, soluble salts or compounds, no rinsing after use is necessary and the flushed membrane cartridges or modules may be directly returned to production. Thus, rinse water costs, labor and additional down time is saved.

No scrubbing or mechanical or hydraulic action on the membrane surface is employed in the process of this invention. The membrane may be cleaned in place in its cartridge or module, without dismantling these to expose the membrane surface for scrubbing or forceful washing with water streams or sprays. Therefore, the membrane assembly is not disturbed and the costs for dismantling and reassembly are saved. I have found that a circulation of ultrapure water under conditions described heretofore will produce excellent surface cleaning at low cost.

The method of this invention is useful for cleaning surfaces of semipermeable membranes employed in a wide variety of membrane process systems. These will include reverse osmosis systems used for purifying water and other solutions, and ultrafiltration systems used for separating larger diameter ions and particles from solutions; and which in many cases, the concentrate or particles separated constitute the desired product.

We claim:

1. A method for cleaning a surface of a semipermeable membrane in a membrane process solution treatment system which comprises:
   a. flushing the said surface of said semipermeable membrane with water at substantially atmospheric pressure and of purity greater than about one megohm resistivity.

2. A method according to claim 1, in which said water is of purity between about one megohm and about 18 megohms resistivity.

3. A method according to claim 1, in which said semipermeable membrane is maintained in place in its working assembly during said cleaning.

4. A method according to claim 1, in which said semipermeable membrane surface is flushed with said water of purity greater than about one megohm resistivity at a rate of between about one-tenth gallon and about ten gallons per hour of said water per square foot of membrane area.

5. A method according to claim 4, in which said semipermeable membrane surface is flushed with said water of purity greater than about one megohm resistivity for a period between about one hour and about fifteen hours.

6. A method according to claim 1, in which said flushing is continued until flushing water effluent shows purity approaching that of the original flush water.

7. A method according to claim 1, in which the water of purity greater than about 1 megohm resistivity is produced by treating water of municipal purity containing more than about 200 parts per million total dissolved solids by reverse osmosis to reduce its total dissolved solids content to less than about 200 parts per million, and treating said water of less than about 200 parts per million of total dissolved solids by deionization to produce water of purity greater than about one megohm resistivity.

* * * * *